P. H. CAZIER.
LUMBER PILER.
APPLICATION FILED MAR. 14, 1910.
977,434.
Patented Dec. 6, 1910.
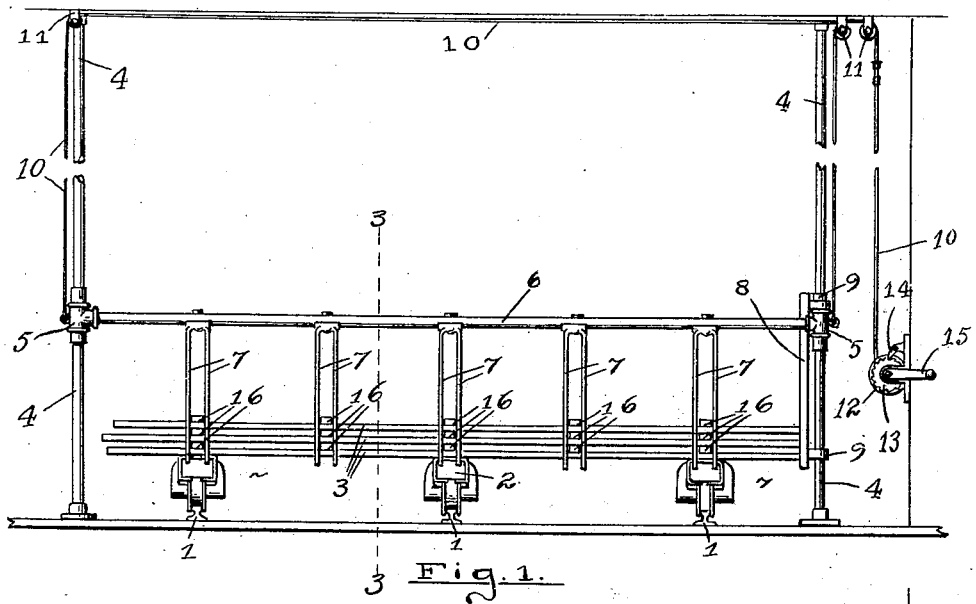
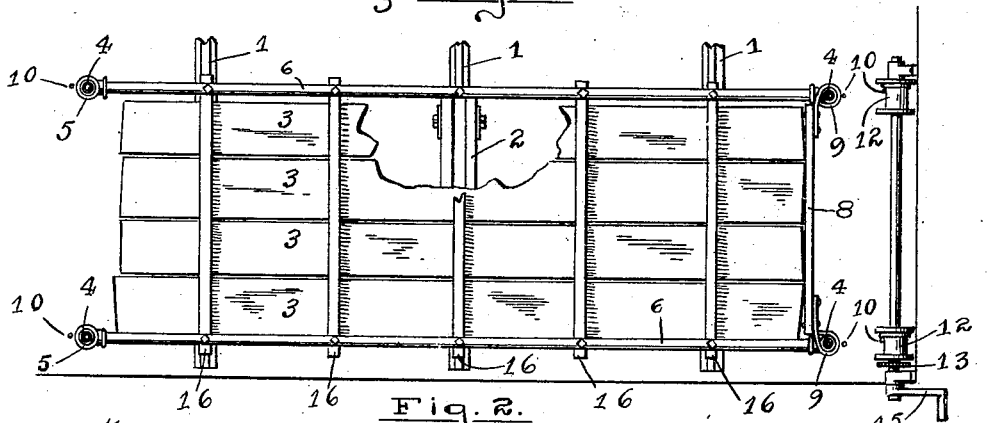
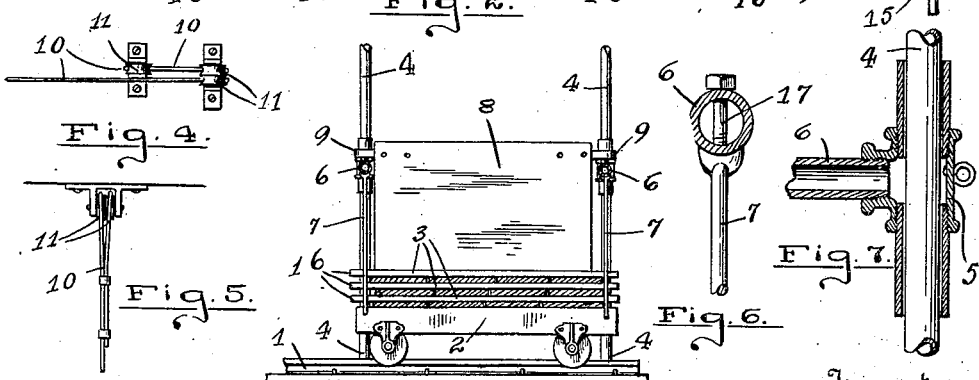
Witnesses
N. O. Van Antwerp
Minnie Thompson
Inventor
Perry H. Cazier
By Luther V. Moulton
Attorney

UNITED STATES PATENT OFFICE.

PERRY H. CAZIER, OF NASHVILLE, MICHIGAN.

LUMBER-PILER.

977,434. Specification of Letters Patent. Patented Dec. 6, 1910.

Application filed March 14, 1910. Serial No. 549,295.

*To all whom it may concern:*

Be it known that I, PERRY H. CAZIER, a citizen of the United States of America, residing at Nashville, in the county of Barry and State of Michigan, have invented certain new and useful Improvements in Lumber-Pilers; and I do hereby declare the following to be a full, clear, and exact description of the invention, such as will enable others skilled in the art to which it appertains to make and use the same.

My invention relates to improvement in lumber pilers, and its object is to provide means for accurately adjusting the lumber and the spacing strips therebetween, and to provide the device with various new and useful features hereinafter more fully described and particularly pointed out in the claims.

My device consists essentially of parallel, horizontally disposed bars, spaced apart, guide members arranged in pairs and extending downward from the said bars, means for raising and lowering said bars and guide members together with a vertically adjustable stop for the ends of the lumber, and in various features of arrangement and construction, as will more fully appear by reference to the accompanying drawings, in which:

Figure 1 is a front elevation of a device embodying my invention; Fig. 2 a plan view of the same with parts removed; Fig. 3 a transverse section of the same on the line 3—3 of Fig. 1; Fig. 4 an enlarged detail in inverted plan of the upper pulleys; Fig. 5 an elevation of the same; Fig. 6 an enlarged detail of the fastening means for the depending guides 7; and Fig. 7 an enlarged detail of the supports for the rails 6.

Like numbers refer to like parts in all of the figures.

1 represents parallel rails, and 2 trucks mounted thereon, which may be used with my device in the event that the lumber is to be transported from place to place, such as moving lumber into a dry-kiln and out again.

3 represents the lumber or boards for piling which my device is adapted.

4 represents posts extending vertically at the respective four corners of a parallelogram and spaced apart sufficient to permit the piled lumber to pass therebetween either longitudinally or laterally as occasion may require (the drawing showing a lateral arrangement of the tracks). On each post is a vertically slidable tee 5, and carried by these tees are bars 6 preferably consisting of iron pipes of considerable size and strength, one bar being at each side of the pile of lumber. Depending from these bars at suitable intervals are vertical guides 7 arranged in parallel pairs and spaced apart sufficient to receive the ends of transverse spacing strips 16 placed between the respective layers of lumber. These vertical guides are rigidly attached to the bars and to permit of readily sliding the lumber over and in contact with one of the bars, each pair of guides is provided with a bolt 17 at the top extending through the bar 6 and screwed into the connecting member at the top of the bars. The guides 7 serve to accurately adjust the spacing strips one above the other and also to laterally guide the lumber so that the outer edges of the boards will be in a vertical plane.

To adjust the lumber longitudinally a stop 8 is provided consisting of a transversely arranged board supported in a vertical plane and vertically adjustable by means of eyes 9 slidable on the posts 4 and attached to the respective corners of the board. This board 8 serves as an end stop against which the lumber is thrust as it is placed on the pile.

To permit of passing the lumber over the bar 6 and also to secure sufficient rigidity of the guides 7, these guides are of moderate length and the bars together with these guides and the stop 8 are made vertically adjustable and moved up from time to time as the pile is increased, and finally hoisted wholly above the pile, when the lumber is to be run out from within the device. For this hoisting purpose, I provide cords 10 extending upward from the respective ends of each bar and attached to each tee 5. The cords extend over suitably located guide pulleys 11 and are simultaneously wound upon drums 12 by means of a crank 15, and held thus wound by means of a ratchet wheel 13 and pawl 14 mounted on the same shaft with the drums.

In operating my device, the trucks are first placed in position on the respective rails and the bars 6 are lowered so that the guides 7 and stop 8 extend below the plane of the upper surfaces of the trucks, and the first layer of boards laid on the trucks. The ends of the boards will be stopped in line by the stop 8, and the edge of the first board in the series will be adjusted at right angles thereto by the guides 7. The first series of spacing strips are then placed between the guides, and another layer of boards laid thereon, which will in like manner be adjusted directly above the first layer thereof. The bars 6 serve as a support over which the boards can be slid as they are passed to the piler, and as the pile increases, the bars 6 and the guides and stop are moved upward from time to time by winding the cords 10 on the drums 12 by manually operating the crank 15, the pawl and ratchet holding the same as the device is adjusted from time to time. When the pile of boards is completed, the bars and parts supported thereby are raised above the plane of the pile, which can then be run out between the posts 4, in whatever direction the track may be extended. Obviously one of the bars 6 may be omitted, together with the guides attached thereto and the guides may be single instead of in pairs, if so preferred, but I prefer the construction shown, as being more complete and satisfactory.

What I claim is:—

1. A lumber piler, comprising parallel, horizontally disposed bars spaced apart, and guide members arranged in pairs and extending downward therefrom.

2. A lumber piler, comprising parallel, horizontally disposed bars spaced apart, guide members arranged in pairs and extending downward from the bars, and means for vertically adjusting the bars.

3. A lumber piler, comprising parallel horizontally disposed bars spaced apart, posts supporting the bars, means for vertically adjusting the bars, and guide members carried by the bars and extending downward therefrom.

4. A lumber piler, comprising parallel horizontally disposed bars spaced apart, guide members depending rigidly from the bars, and an end stop extending transversely between the bars.

5. A lumber piler, comprising vertical posts, tees slidable on the posts, bars carried by the tees, a stop extending transversely between the bars and adjustably supported by the posts, guide members rigidly depending from the bars, and means for vertically adjusting the bars and stop.

6. A lumber piler, comprising vertical posts spaced apart at the angles of a parallelogram, vertically adjustable bars carried by the posts, a board extending between the bars, eyes on the respective angles of the board slidable on the posts, guide members rigidly depending from the bars, and means for hoisting the bars guide members and stop.

7. A lumber piler, comprising vertical posts arranged at the respective angles of a parallelogram, tees slidable on the posts, bars carried by the tees, guide members rigidly depending from the bars, a board arranged transversely at one end of the bars, eyes on the board slidable on the posts, cords to hoist the bars and board, pulleys over which the cords extend, winding drums for the cords, a pawl and ratchet to hold the drums and a crank to manually rotate the drums to simultaneously wind the cords.

8. A lumber piler, comprising a bar, depending guide members arranged in parallel pairs, each pair provided with a bolt extending through the bar to rigidly attach the said members to the bar.

9. A lumber piler, comprising a horizontally disposed bar, a pair of parallel guide members extending vertically below the bar and having a connecting member, and a bolt extending through the bar and screwed into the connecting member.

10. The combination of parallel tracks, trucks on the tracks, vertical posts at the respective sides of the tracks and at the respective angles of a parallelogram, tees slidable on the posts, horizontally disposed bars spaced apart and carried by the tees, guide members arranged in opposing pairs on said bars and rigidly depending therefrom, a stop board extending transversely at one end of said bars, eyes on the board slidable on two of the posts, cords supporting the bars and board together with the parts attached thereto, guide pulleys engaging said cords, drums on which the cords are simultaneously wound, a pawl and a ratchet to hold said drums, and a crank to manually rotate the drums.

In testimony whereof I affix my signature in presence of two witnesses.

PERRY H. CAZIER.

Witnesses:
GEORGIANA CHACE,
LUTHER V. MOULTON.